US008949509B2

(12) United States Patent
Schuette (10) Patent No.: US 8,949,509 B2
(45) Date of Patent: Feb. 3, 2015

(54) MASS STORAGE SYSTEMS AND METHODS USING SOLID-STATE STORAGE MEDIA AND ANCILLARY INTERFACES FOR DIRECT COMMUNICATION BETWEEN MEMORY CARDS

(75) Inventor: Franz Michael Schuette, Colorado Springs, CO (US)

(73) Assignee: OCZ Storage Solutions Inc., San Jose, CA (US)

( * ) Notice: Subject to any disclaimer, the term of this patent is extended or adjusted under 35 U.S.C. 154(b) by 712 days.

(21) Appl. No.: 13/311,723

(22) Filed: Dec. 6, 2011

(65) Prior Publication Data

US 2012/0144096 A1 Jun. 7, 2012

Related U.S. Application Data

(60) Provisional application No. 61/420,023, filed on Dec. 6, 2010.

(51) Int. Cl.
*G06F 13/00* (2006.01)
*G06F 3/06* (2006.01)
*G06F 13/40* (2006.01)

(52) U.S. Cl.
CPC .............. *G06F 3/061* (2013.01); *G06F 3/0658* (2013.01); *G06F 3/0659* (2013.01); *G06F 3/0688* (2013.01); *G06F 13/40* (2013.01)
USPC ................................... 711/103; 711/E12.035

(58) Field of Classification Search
None
See application file for complete search history.

(56) References Cited

U.S. PATENT DOCUMENTS

| | | | |
|---|---|---|---|
| 6,816,915 B1* | 11/2004 | Packer | 710/2 |
| 2003/0204583 A1* | 10/2003 | Kaneda et al. | 709/223 |
| 2004/0017707 A1* | 1/2004 | Wallace et al. | 365/200 |
| 2004/0168014 A1* | 8/2004 | Lofgren et al. | 711/103 |
| 2005/0216622 A1* | 9/2005 | Iyer et al. | 710/62 |
| 2008/0071902 A1* | 3/2008 | Kaneda et al. | 709/223 |
| 2008/0133804 A1* | 6/2008 | Iyer et al. | 710/67 |
| 2010/0023619 A1* | 1/2010 | Kaneda et al. | 709/224 |
| 2013/0145088 A1* | 6/2013 | Frost et al. | 711/103 |
| 2014/0223068 A1* | 8/2014 | Shaeffer et al. | 710/308 |

* cited by examiner

*Primary Examiner* — Sean D Rossiter
(74) *Attorney, Agent, or Firm* — Hartman Global IP Law; Gary M. Hartman; Michael D. Winter (57) ABSTRACT

A mass storage system comprising multiple memory cards, each with non-volatile memory components, a system bus interface for communicating with a system bus of a host system, and at least one ancillary interface. The ancillary interface is configured for direct communication of commands, addresses and data between the memory cards via a cross-link connector without accessing the system bus interface.

21 Claims, 4 Drawing Sheets

MASS STORAGE SYSTEMS AND METHODS USING SOLID-STATE STORAGE MEDIA AND ANCILLARY INTERFACES FOR DIRECT COMMUNICATION BETWEEN MEMORY CARDS

CROSS REFERENCE TO RELATED APPLICATIONS

This application claims the benefit of U.S. Provisional Application No. 61/420,023, filed Dec. 6, 2010, the contents of which are incorporated herein by reference.

BACKGROUND OF THE INVENTION

The present invention generally relates to mass storage systems that comprise non-volatile memory devices and their use in personal computers and servers. In particular, this invention relates to the use of an array of multiple solid-state storage devices with a PCIe or similar system I/O interface, wherein an additional cross-link interface independent of the system bus can be used to synchronize the activity of all devices in the array. Additional functions of the cross-link interface may encompass sharing of parity data across the array.

Solid-state drives (SSDs) are in the process of replacing rotational magnetic hard disk drives at least on the level of system drives in personal computers and in server environments. The currently prevailing non-volatile memory technology employed in SSDs uses NAND flash memory, primarily because of its low cost per bit. NAND flash memory, however, has several functional disadvantages such as limited endurance and data retention and relatively high initial access latency. Another drawback of NAND flash memory is that it cannot scale with future process technologies, since proximity effects in the form of electrical fields can easily alter the programming charge of the floating gates, and thereby alter the bit contents of the NAND flash memory cell. It is therefore conceivable that alternative memory technologies, for example, magneto resistive random access memory (MRAM), phase change memory (PCM) or resistive memory (RRAM), may become the next non-volatile memory media of choice.

Current SSDs have been developed primarily as drop-in replacement for existing hard disk drives. This development was driven primarily by the need to facilitate market acceptance and easy migration from mechanical hard disk drives to the new solid-state media. Accordingly, the same interfaces and protocol are employed, using advanced technology attachment (ATA) protocol and command sets and adopting existing file systems, for example, Microsoft® Windows NT File System (NTFS), for NAND flash-based media. At the same time, compared to other memory technologies, NAND flash memory is limited by initial access latencies in the order of several hundreds of micro seconds. Even if those access latencies are substantially shorter than those of conventional hard disk drives, they still allow use of a relatively slow flash controller. For example, in the case of a serial ATA interface, the preferred practice is to use a SATA controller with a flash translation layer and several back-end channels for parallel access of multiple flash memory devices or a combination of several such arrangements in combination with a PCIe-based RAID controller. Because of the inherent properties of NAND flash memory there is currently no huge incentive for developing alternative access technologies.

It is conceivable that future non-volatile memory technologies will allow faster access of an array of solid-state memory media than current NAND flash memory. By extension, this means that system latencies will weigh in heavier in the overall latencies, and therefore alternative system interface technologies will become more attractive. For example, instead of using translation of logical block addresses into NAND flash memory pages using a flash translation layer (FTL) of an SSD controller, it may become standard to use a memory-based file system using a virtual address space similar to that already employed in system dynamic random access memory (DRAM). Depending on the performance characteristics of the memory technology used, it is assumed that stand-alone devices may function very well on existing bus interface technologies. However, if several devices are used in parallel, it is foreseeable that bus and protocol overheads like hand-shake and device arbitration may cause problems in the form of bus contention.

A similar development has occurred in the case of graphics adapters in order to split the workload over two or more different graphics processing units (CPUs). This technology was first introduced as Scan-Line Interleave (SLI) technology by 3Dfx Interactive, Inc., and is currently available in the market as Scalable Link Interface (SLI) through nVidia Corporation and AMD CrossFireX through Advanced Micro Devices, Inc. Briefly, in both cases, the data transfer to the graphics cards is still done exclusively via the system bus interface. However, up to four devices communicate with each other through a dedicated ancillary bus. For example, in the AMD CrossFireX product, the dedicated ancillary bus is connected to a CrossFireX compositor logic. In that particular situation it is critical that the individual graphics processing units know the presence and detailed timing of each other in order to avoid dropping frames, scrambling of displayed images by out of order signaling to the monitor, or by generating partially overlapping images that could lead to tearing and distortion of the displayed images. In general, all of the internal communication could theoretically be done via the system bus. However, it is generally accepted that doing so would result in bus congestion and unnecessary latencies in the cross-talk between the cards. Consequently, a valid signal between two or more compositors is necessary in order to enable AMD CrossFireX on the driver level.

Aside from signaling each card's presence to the others, the main benefit of the ancillary bus is to allow direct communication and synchronization of the different devices, thus not only shortening latencies but also relieving the system bus of timing signals that would tie up bandwidth. In a dual card configuration, the benefit for the integration of both devices into a single logical unit may be merely ease of integration, but the improvement becomes more tangible with every additional device.

Advanced non-volatile memory technologies that are capable of faster load and store operations than NAND flash memory are currently emerging. Therefore, it appears that a solution is needed that is similar to that employed in graphics subsystems. Specifically, in the case of multiple storage cards used in an array similar to that currently known as RAID, it would be advantageous for different cards to talk directly to each other, for example, to confirm filling of a cache line or commitment of a set of data to the memory array, or to distribute parity data across the different members of the array without congesting the system interface bus. Of particular interest would be to use locally generated error checking and correction (ECC) algorithms (also known as error correction code), such as Reed Solomon (R-S) or Bose-Ray-Chaudhuri-Hocquenghem (BCH) or low density parity check (LDPC), to generate a checksum of the data during writes and then cross-reference the checksum on subsequent reads with a recalculated checksum of the data. In the interest of fail-over mechanisms, the checksum could be written to a different card than that storing the data using a dedicated bus.

BRIEF DESCRIPTION OF THE INVENTION

The present invention provides a non-volatile solid-state memory storage system configured for use in a host system, for example, a personal computer or a server, wherein the storage system includes multiple individual memory storage devices that communicate with each other through a dedicated cross-link connector to avoid system bus contention with control signals and error correction overhead.

According to a first aspect of the invention, a mass storage system is provided for use with a host system. The mass storage system includes at least first and second memory cards, each comprising a memory controller, non-volatile memory components associated with the memory controller, a system bus interface for communicating with a system bus of the host system, and at least one ancillary interface that is configured for direct communication of commands, addresses and data between the first and second memory cards via a cross-link connector.

According to a second aspect of the invention, a method is provided for increasing the performance of a non-volatile solid-state memory-based storage system of a host system. The method includes configuring multiple memory cards as a super-array in which each of the memory cards has non-volatile memory components, a system bus interface to a system bus of the host system, and an ancillary interface that provides a direct cross-link between the memory cards. Commands, addresses and data are transmitted to the memory cards via the system bus interface, and timing and status information are transmitted between the memory cards via the ancillary interfaces and the cross-link without accessing the host system or the system bus thereof.

According to additional aspects of the invention, methods are provided for storing data including parity information across a plurality of memory cards. Each memory card has non-volatile memory components, a memory controller, a system bus interface for exchanging commands, addresses and data with a system bus of a host system, and an ancillary interface that provides a direct cross-link between at least first and second memory cards. Each memory card may further include an error checking and correction (ECC) engine, in which case the method includes transferring ECC data to at least the second memory card via the cross-link during writes to a first memory card, and retrieving the ECC data from the second memory card via the cross-link and without accessing the system bus during reads from the first memory card. Alternatively or in addition, each of the memory card may have a parity calculation engine to generate parity values, in which case the method includes transferring intermediate parity values from the first and second memory cards to a third memory card via the cross-link during writes to the first and second memory cards, so that the intermediate parity data provide redundancy for corresponding data stored on the first and second memory cards. The intermediate parity values from the first and second memory cards are combined to generate redundancy information, which is then stored on at least the third memory card.

From the above, it can be appreciated that a technical effect of the invention is the ability to store data and propagate control, status and timing signals, including the distribution of ECC and/or redundancy information, among multiple memory cards that form part of an array of memory cards used by a host system.

Other aspects and advantages of this invention will be better appreciated from the following detailed description.

DETAILED DESCRIPTION OF THE INVENTION

Figure 1:
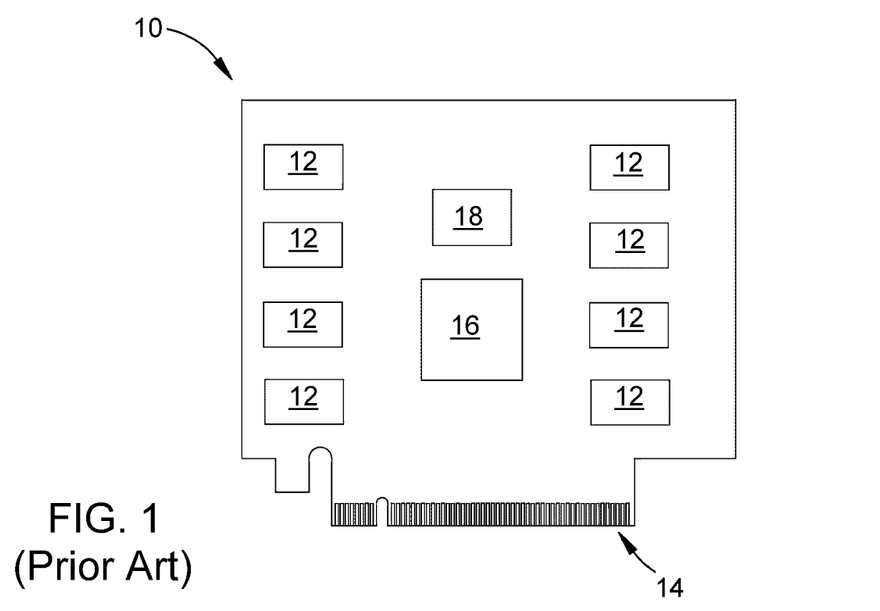
FIG. 1 represents an expansion memory card that comprises non-volatile memory components as memory storage media and an edge connector configured for interfacing with a host system in accordance with the prior art.

FIG. 1 schematically illustrates a prior art memory storage device in the form of an expansion memory card 10. While the term "card" will be used in the following discussion, it should be understood that the term encompasses various other physical forms of memory storage devices that can be installed and used in host systems, for example, personal computers and servers. For use in the currently prevailing system architecture, the memory cared 10 is represented as being configured to use what is currently the most common system bus interface, the peripheral component interconnect express (PCI express or PCIe) interface, though other system bus interfaces could be utilized by the card 10.

The memory card 10 is equipped with an array of non-volatile memory components (ICs) 12 and a system interface in the form of an edge connector 14 configured for interfacing with a host system. The connector 14 may, for example, plug into a PCIe socket on a motherboard. Similar memory storage cards have been used under the "Robson" technology umbrella introduced by Intel Corporation. As represented in FIG. 1, the memory card 10 further includes a controller 16 that provides a bus interface and control logic (translation layer) to address the non-volatile memory components 12 for the loading and storing of data. The controller 16 may also include an ECC engine to compensate for bit errors that may occur as a consequence of soft errors or data leakage, as may result from stress-induced leakage current, environmental factors such as temperature fluctuation, or simply as a by-product of near-field effects in ultra-small process geometries. The nature of these errors will in all cases depend on the memory technology employed by the components 12, and therefore bit errors may occur from other causes. In all cases, placing the ECC engine locally on the card 10 conserves I/O bandwidth otherwise used to transfer data to the host system in order to perform parity calculations (writes) or data and checksum (or parity data) transfers for comparison-based integrity checks, for example, by a central processing unit (CPU) of the host system. The card 12 is also represented in FIG. 1 as having a memory cache 18, for example, a fast memory cache, as an intermediate buffer to facilitate receiving incoming data off the host system bus as quickly as possible and further, for write combining of smaller data sets that would otherwise cause poor write utilization to the array of non-volatile memory components 12. The cache 18 may be a separate IC or optionally be integrated into the controller 16.

Whenever removable devices, including memory storage devices, are part of a system configuration, the host and removable devices often use some type of hand-shake protocol to negotiate the transfer protocol and resource allocation on boot-up. Those initialization and configuration negotiations aside, storage devices also use additional handshake mechanisms to initiate transfers in either direction (load and store) and also to confirm completion of the transfer and/or commitment of the data into permanent storage. These handshakes cause access latencies.

At the current state of technology and in configurations with a single memory device, specifically with large blocks of data being written to an array of non-volatile memory components, access latencies generally do not constitute a problem since the primary limitation is encountered in the form of an initial read or write access latency or the write performance of the array of memory components rather than by the bus protocol overhead and the hand-shake mechanism between the memory device and its host system. However, in a situation where multiple memory devices interact with each other, the situation is more complex. Referring again to the memory card 10 of FIG. 1, in a multi-drop bus system the memory card 10 fills the cache 18 and then commits the data to the non-volatile memory components 12. Subsequently, the card 10 signals to the host system that a transfer has been completed, and then relinquishes the bus while writing the data to the memory components 12. In a bus interface with dedicated lanes to allow for a point to point connection with each memory card, multiple cards can be addressed in parallel. However, as soon as there are dependencies through the different data sets or blocks, each memory card must wait until the previous card has acknowledged the acceptance of its respective data set in order to warrant data coherency.

Figure 2:
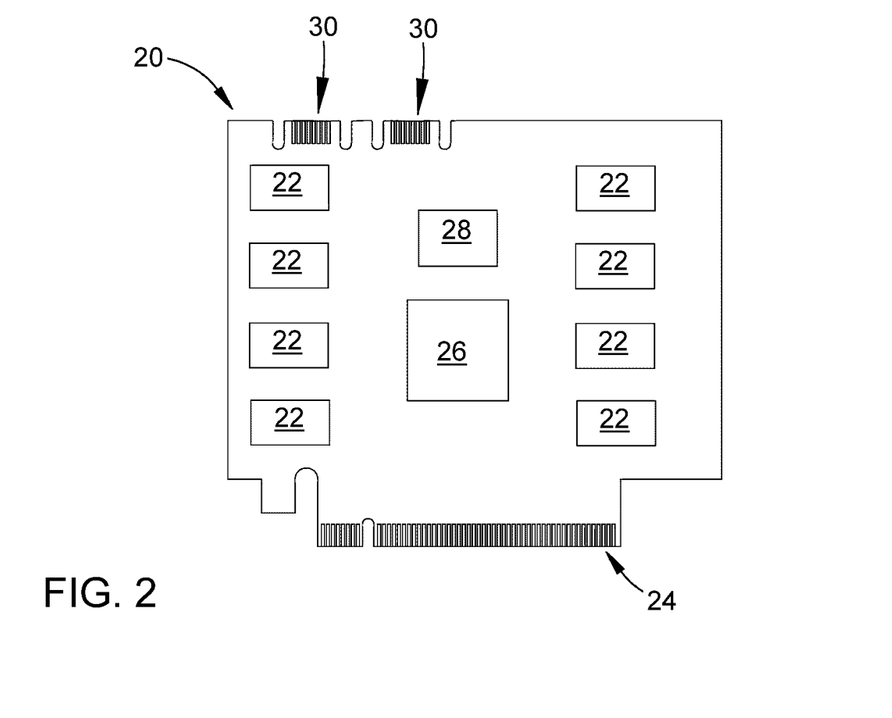
FIG. 2 represents an expansion memory card similar to the memory card of FIG. 1 but further configured to have two ancillary edge connectors in accordance with an embodiment of the present invention.

FIG. 2 represents a memory card 20 configured in accordance with a embodiment of the invention. Similar to the card 10 of FIG. 1, the memory card 20 is equipped with an array of non-volatile memory components 22, a volatile memory cache 28, a memory controller 26 adapted to control both non-volatile memory components 22 and the volatile memory cache 28 for data storage and caching, respectively. The controller 26 preferably includes a functional bus interface and a translation layer adapted to translate logical addresses generated by a host system (for example, a personal computer or a server) into physical addresses on the memory components 22. The non-volatile memory components 22 may include, for example, solid-state NAND flash memory, magnetoresistive random access memory (MRAM), phase change memory (PCM), resistive memory (RRAM), etc., in which case the card 20 can be referred to as a solid-stated drive (SSD).

As with the prior art card 10 of FIG. 1, the memory card 20 further includes a system interface in the form of an edge connector 24 configured for interfacing with the host system. The connector 24 routes data, address, command and clock signals from the host system to the controller 26 in a serialized, packetized or parallel format. In stand-alone mode, the connector 24 can be sufficient to provide all signals needed for the operation of the card 20. As represented in FIG. 2, the edge connector 24 is configured to plug into a PCIe socket on a motherboard. Though the connector 24 is specifically configured as conventional edge connector, the use of other types of interfaces is foreseeable. Furthermore, the use of other system bus interfaces that will likely supersede the current PCIe architecture is also within the scope of the invention. Of particular interest could be a broadcasted multidrop bus using a dedicated device-select signal to assign an active/inactive status to the card 20 when connected to a host system.

Figure 3:
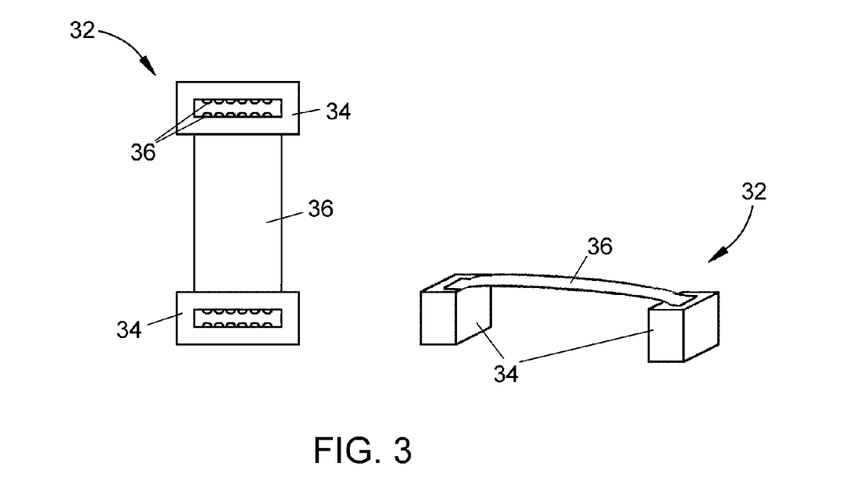
FIG. 3 contains two views of a cross-link connector assembly configured to couple with the ancillary edge connectors of two memory cards.

In contrast to the card 10 of FIG. 1, the memory card 20 is represented as further including two ancillary edge connectors 30. These edge connectors 30 are not adapted to be connected to the host system bus, but instead are dedicated for use with an ancillary bus that enables cross-link communications with other compatible memory cards, such as additional memory cards configured similarly to what is represented in FIG. 2. The ancillary edge connectors 30 are each configured to couple with a cross-link connector assembly, such as a cross-link connector assembly 32 represented as a nonlimiting example in FIG. 3, and together define the ancillary bus. The cross-link connector assembly 32 is shown in FIG. 3 as comprising two boxed connectors 34 with electrical contacts 36 that face inward and each other. The contacts 36 of the connectors 34 are connected through a mini circuit board, for example, a flex-circuit board 38. As noted above, the cross-link connector assembly 32 is adapted to provide communications between the memory cards 20 of FIG. 2 and a second memory card, for example, of the type represented in FIG. 2. If more than two cards 20 are desired to be functionally interconnected, at least one of the cards 20 must be equipped with at least two ancillary edge connectors 30, as represented in FIG. 2.

Figure 4:
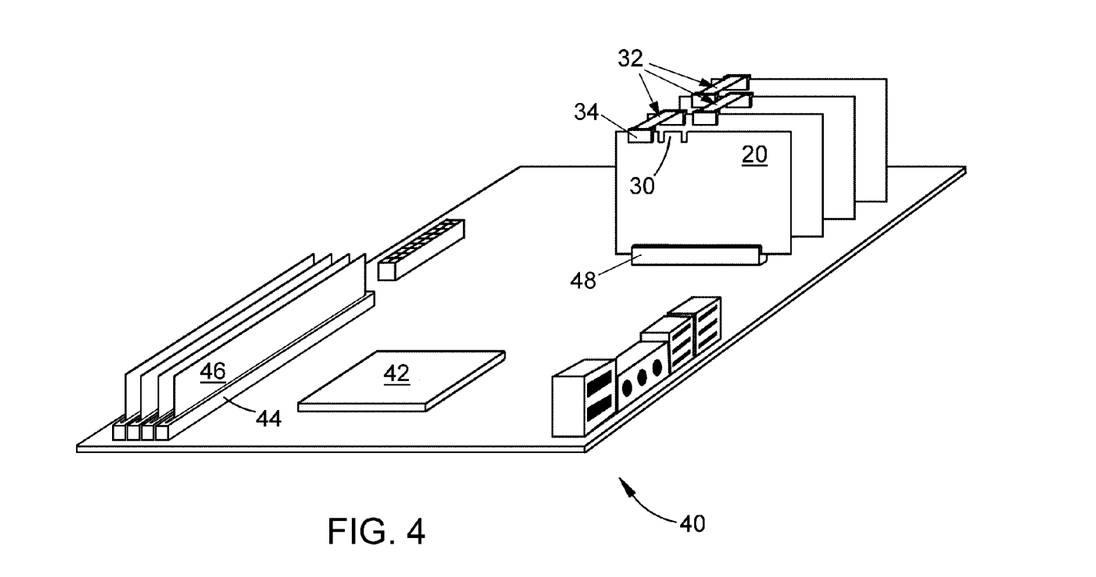
FIG. 4 represents a motherboard in which four expansion memory cards are installed of the type represented in FIG. 2, functionally connected with cross-link connector assemblies of the type represented in FIG. 3.

FIG. 4 illustrates a host system motherboard 40 that is conventionally configured as a circuit board equipped with a central processing unit (CPU) 42, which can be conventionally connected to memory (expansion) slots (sockets) 44 with parallel command address and data buses (not shown). Memory modules 46 are represented as being installed in the memory slots 44. Four expansion memory cards 20 of the type represented in FIG. 2 are represented as being plugged into PCIe sockets 48 on the motherboard 40 though their respective "primary" edge connectors 24. In addition, the four memory cards 20 are capable of communicating with each other through their respective ancillary connectors 30 and multiple cross-linking connector assemblies 32. Together, the array of memory cards 20 defines a non-volatile mass storage system for a host system in which the motherboard 40 is installed.

As in FIG. 4, where multiple memory cards 20 are in use, it is possible to treat the cards 20 as individual devices or memory spaces, based on each card's logical unit number. However, it is also possible to combine two or more memory cards 20 to create a super-array that appears to the host system as a single logical unit. In this case, both cards 20 will use their primary edge connectors 24 for command, address and data signals, but will further interact with each other through their ancillary connectors 30. In preferred implementations of the invention, one of the memory cards 20 preferably assumes the role of a master, while the remaining one or more memory cards 20 assume the role of slave device(s).

Figure 5:
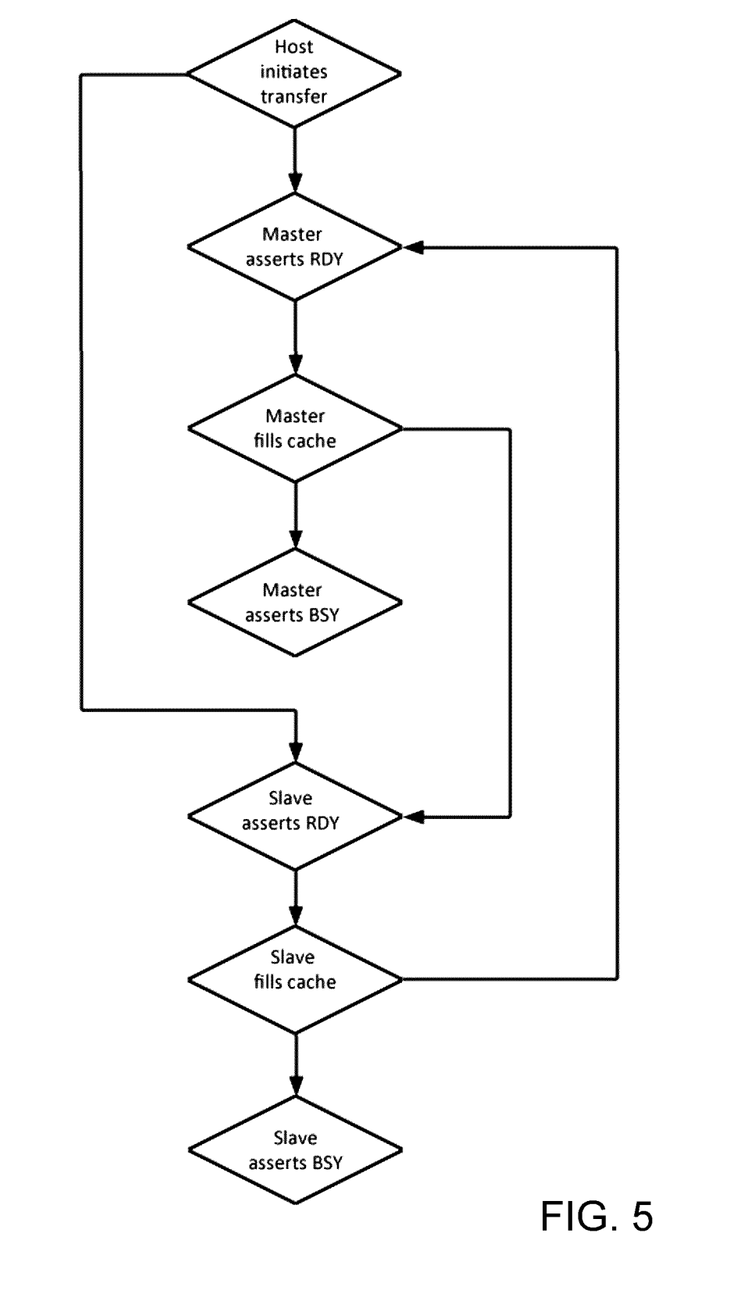
FIG. 5 shows a flow diagram of workload hand-off that can occur between memory cards of FIG. 3 based on cache fill levels.

In one aspect of the invention illustrated in FIG. 5, a write from the host system to a super-array defined by the memory cards 20 of FIG. 4 will request the transfer of a block of data from the system bus to one of the cards 20 serving as the master. If the master card 20 asserts a ready (RDY) signal, the master card 20 initiates a first party direct memory access (FPDMA) request and fills, at maximum bus interface transfer rate, one pre-allocated amount of space in the fast volatile memory cache 28 on the master card 20, which could be for example a pipelined burst SRAM. Overlapping with the DMA transfer, the master card 20 signals through its ancillary connector 30 to a first of the slave cards 20 to initiate its own FPDMA request as soon as it receives confirmation that the cache 28 of the master card 20 has been filled with data or timed such that the request is initiated a number of cycles before the master card's cache is filled with data. The time interval defined by the number of cycles can be substantially the same as the read access latency of the slave card 20 to its non-volatile memory components 22 or the write access latency of the slave card 20 to the host system. As such, an early transfer command can mask the latencies between different transfers and allow back-to-back transactions. As soon as the cache 28 of the master card 20 is full of data, the card 20 asserts a busy (BSY) signal and disconnects from the bus. Concurrently, the first slave card 20 asserts a ready (RDY) signal and starts its own FPDMA transfer to continue the on-going data transfer until its cache (or register) is filled with data. At that moment the first slave card 20 asserts a busy (BSY) signal. Depending on the number of slave cards 20, the signal to initiate a DMA request (initDMA) is propagated to a second slave card 20 or goes back to the master card 20, which will execute the DMA request as soon as the previous data have been committed to its non-volatile memory components 22 and its cache 28 has been flushed of data.

Because all status signals are handled internally within the super-array of memory cards 20, no feedback signals to the bus logic are necessary for initiation of the arbitration of the next portion of the data transfer. Instead, individual cache fills are performed in seamless back-to-back transactions without incurring additional bus arbitration latencies, thereby allowing for maximum sustained data rates. Each card 20 then commits the data from its volatile memory cache 28 to its array of non-volatile memory components 22 while the other cards 20 within the super-array receive data in their caches 28 in a round-robin fashion. As soon as the data are permanently written to the memory components 22 of a card 20, its cache 28 is flushed of data and the card 20 waits for the other cards 20 to finish the round-robin and pass the initDMA signal back to it. Optionally, a non-volatile journaling memory, for example, a FRAM component, can be used to keep track of what data have been stored permanently in order to counteract issues that could arise in the case of a sudden loss of power.

Figure 6:
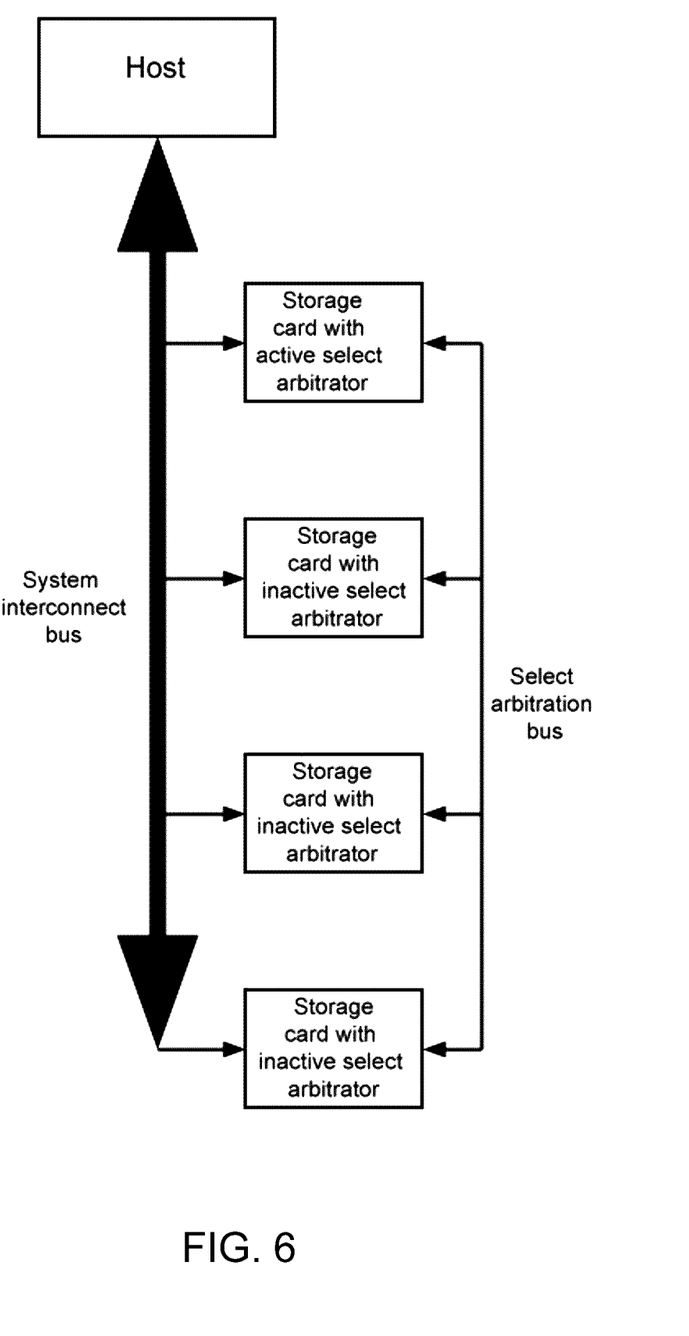
FIG. 6 schematically represents four memory cards connected to a shared system interface bus, wherein one of the cards is used to actively control the select arbitration of the other cards.

A different way for arbitration of the workload is to turn on or off the command and address decoders on a broadcasted, shared bus, as represented in FIG. 6. In this case, the master card 20 provides a device select signal that is communicated via the ancillary bus defined by the ancillary connectors 30 and cross-link connector assemblies 32 of the cards 20, such that the workload can be distributed optimally between all cards 20 based on either the transfer size or a stripe size configuration of all sibling cards 20.

Internally, each card 20 has its own identifier for tracking the individual data blocks, similar as in the case of ranks in system memory that are enabled by individual chip select lines. However, in the current invention, the selection of the slave cards 20 is based on the position of the cards 20 within the system interface slots, meaning that typically the interface closest to the system logic receives the highest priority and, thus defines the master card 20. The functional selection of a slave card 20 is then done by the master card 20 along with maintaining the table of contents.

According to another aspect of the invention, ECC data can be distributed via the ancillary bus to the sibling cards 20. Specifically, the controller 26 of each memory card 20 is equipped with its own ECC engine to perform ECC calculations based on Hamming code parity calculations, Reed-Solomon (RS), Bose Ray-Chaudhuri Hocquenghem (BCH) parameterized error correction codes or low density parity check (LDPC). Having the ECC calculations performed locally on the card 20 is necessary to free up bandwidth that, in a CPU-centric model would otherwise clog the system interface. The checksum is typically stored on the same card 20. However, in order to establish redundancy within the super-array of memory cards 20, it may be preferably to store the checksum of a card 20 on another card 20. Instead of using the system interface, the redundancy data can be written through the ancillary bus directly to another card 20 without wasting primary bus bandwidth. If the controller 26 of a card 20 reads data from its array of non-volatile memory components 22, it simultaneously requests the complementary ECC data from its sister card 20 via the ancillary bus. More specifically, as soon as the controller 26 receives an address for data in the proximal array, it propagates the same address or an internally generated derivative thereof to the sister card 20, which then immediately returns the ECC values for the data requested.

In addition to storing the ECC data for each local data set, a stripe set with distributed parity can be defined based on the cache fill size of the individual cards 20. In this particular aspect, the local ECC data will be stored on the card 20 having the corresponding data but the parity or ECC information for each stripe set will be stored on another card 20. In system configurations using identical cards 20, for example, all cards 20 using multi level cell (MLC) flash, a distributed, round-robin storage of parity data is most advantageous. However, given the superior endurance and data retention of single level cell (SLC) flash, another possibility is to dedicate one of the memory cards 20 for storing parity data, similar to a RAID Level 4 (block level striping with dedicated parity) configuration, and equip the dedicated memory card with SLC flash memory components so that it is capable of exhibiting higher write endurance and data retention than the other memory cards 20 used primarily or solely for data storage.

While the invention has been described in terms of specific embodiments, it is apparent that other forms could be adopted by one skilled in the art. For example, while certain components are shown and described as being preferred for the memory cards 20, including non-volatile memory components 22 and dedicated cross-link connector assemblies 32 between sister cards 20, it is foreseeable that functionally-equivalent components could be used or subsequently developed to perform the intended functions of the disclosed components. Furthermore, while the invention is described in reference to expansion memory cards represented in the figures, other physical forms of mass storage devices and systems are also within the scope of the invention. Therefore, the scope of the invention is to be limited only by the following claims.

The invention claimed is:

1. A mass storage system for use with a host system comprising at least first and second memory cards, each of the first and second memory cards comprising a memory controller, non-volatile memory components associated with the memory controller, a system bus interface for communicating with a system bus of the host system, and at least a first ancillary interface, the first ancillary interface being configured for direct communication of commands, addresses and data between the first and second memory cards via a cross-link connector, wherein the first and second memory cards are configured to communicate through the system bus interface and the first ancillary interface simultaneously.

2. The mass storage system of claim 1, wherein each of the first and second memory cards has a volatile memory cache to which data are stored prior to being stored in the non-volatile memory components thereof.

3. The mass storage system of claim 1, wherein the first memory card has a second ancillary interface configured for direct communication of commands and addresses with a third memory card via a second cross-link connector.

4. The mass storage system of claim 1, wherein the first and second memory cards are configured so that a request for a data transfer between the second memory card and the host system is communicated from the first memory card to the second memory card through the cross-link connector without accessing the system bus of the host system.

5. The mass storage system of claim 4, wherein each of the first and second memory cards has a volatile memory cache, and the first and second memory cards are configured so that the request for the data transfer between the second memory card and the host system is initiated before the completion of a fill of the volatile memory cache of the first memory card.

6. The mass storage system of claim 5, wherein the request for a data transfer between the second memory card is issued a time interval before the completion of a fill of the volatile memory cache of the first memory card, and wherein the time interval is substantially equal to a read access latency of the second memory card to the non-volatile memory components thereof or a write access latency of the second memory card to the host system.

7. The mass storage system of claim 1, wherein the non-volatile memory components of the first and second memory cards comprise NAND flash memory, magnetoresistive random access memory (MRAM), phase change memory (PCM), or resistive memory (RRAM).

8. A method of increasing performance of a non-volatile solid-state memory-based storage system of a host system, the method comprising: configuring multiple memory cards as a super-array in which each of the memory cards has non-volatile memory components, a system bus interface to a system bus of the host system, and an ancillary interface that provides a direct cross-link between the memory cards; transmitting commands, addresses and data to the memory cards via the system bus interface; and transmitting timing and status information between the memory cards via the ancillary interfaces and the cross-link without accessing the host system or the system bus thereof, wherein transmitting commands, addresses and data via the system bus interface and transmitting timing and status information via the ancillary interface occurs simultaneously.

9. The method of claim 8, wherein each of the memory cards has a volatile memory cache and the method further comprises storing data in the volatile memory cache prior to being stored in the non-volatile memory components.

10. The method of claim 9, further comprising initiating via the cross-link a transfer request from a first of the memory cards to a second of the memory cards at a time interval before the termination of an on-going transfer between the first memory card and the host system, wherein the time interval is substantially equal to a read access latency of the second memory card to the non-volatile memory components thereof or a write access latency of the second memory card to the host system.

11. The method of claim 9, further comprising:
transferring data from the host system to the volatile memory cache of a first of the memory cards;
comparing the write access latency of a second of the memory cards to the number of system bus cycles necessary to fill a block of the volatile memory cache of the first memory card; and
when the number of remaining system bus cycles to fill the block of the volatile memory cache approximates the number of system bus cycles corresponding to the write access latency of the second memory card, communicating a command from the first memory card to the second memory card via the ancillary interface to initiate access to the system bus.

12. The method of claim 9, further comprising:
transferring data from the host system to the volatile memory cache of a first of the memory cards;
comparing the read access latency of a second of the memory cards from the non-volatile memory components thereof to the number of remaining transfers from the volatile memory cache of the first memory card to the system bus; and
communicating with the first memory card a read transfer to the second memory card through the ancillary interface at a time interval before the termination of the transfers from the volatile memory cache of the first memory card to the system bus, wherein the time interval approximates the read access latency of the second memory card from the non-volatile memory components thereof.

13. The method of claim 8, wherein the non-volatile memory components of the memory cards comprise NAND flash memory, magnetoresistive random access memory (MRAM), phase change memory (PCM), or resistive memory (RRAM).

14. A method for storing data including parity information across a plurality of memory cards, wherein each of the memory cards has non-volatile memory components, a memory controller, a system bus interface for exchanging commands, addresses and data with a system bus of a host system, an error checking and correction (ECC) engine, and an ancillary interface that provides a direct cross-link between at least a first and a second of the memory cards, the method comprising: transferring ECC data to at least the second memory card via the cross-link during writes to the first memory card via the system bus interface; and retrieving the ECC data from the second memory card via the cross-link and without accessing the system bus during reads from the first memory card via the system bus interface.

15. The method of claim 14, wherein the transferring step comprising distributing the ECC data across the second memory card and at least a third of the memory cards in a round-robin fashion.

16. The method of claim 14, wherein all of the ECC data of others of the memory cards are written to the second memory card.

17. The method of claim 16, wherein the non-volatile memory components of the second memory card have higher write endurance and data retention than the non-volatile memory components of the other memory cards.

18. A method for storing data including parity information across a plurality of memory cards, wherein each of the memory cards has non-volatile memory components, a memory controller, a system bus interface for exchanging commands, addresses and data with a system bus of a host system, a parity calculation engine to generate parity values, and an ancillary interface that provides a direct cross-link between at least a first, second and third of the memory cards, the method comprising: transferring intermediate parity values from the first and second memory cards to the third memory card via the cross-link during writes to the first and second memory cards via the system bus interface, the intermediate parity data providing redundancy for corresponding data stored on the first and second memory cards; and combining the intermediate parity values from the first memory card and the second memory card to generate redundancy information; and then storing the redundancy information on at least the third memory card.

19. The method of claim 18, wherein the redundancy information is stored in a distributed manner across all of the memory cards in a round-robin fashion.

20. The method of claim 18, wherein all of the redundancy information of others of the memory cards are written to the third memory card.

21. The method of claim 20, wherein the non-volatile memory components of the third memory card have higher write endurance and data retention than the non-volatile memory components of the other memory cards.

* * * * *